United States Patent [19]

Larranaga

[11] 4,447,507
[45] May 8, 1984

[54] CONTACT IN ALKALINE ELECTRIC CELLS

[75] Inventor: Javier A. Larranaga, Vitoria, Spain

[73] Assignee: Celaya, Emparanza Y Galdos S.A. (Cegasa), Vitoria, Spain

[21] Appl. No.: 426,202

[22] Filed: Sep. 28, 1982

[51] Int. Cl.$^3$ .............................................. H01M 2/30
[52] U.S. Cl. .................................... 429/54; 429/170; 429/171; 429/178
[58] Field of Search .............. 429/170, 171, 181, 184, 429/164, 177, 166, 167, 172, 173, 178, 54

[56] References Cited

U.S. PATENT DOCUMENTS

| | | | |
|---|---|---|---|
| 2,060,799 | 11/1936 | Drummond | 429/172 |
| 2,606,942 | 8/1952 | Bohin | 429/166 |
| 2,773,926 | 12/1956 | Glover | 429/167 |
| 3,773,562 | 11/1973 | Pinkowski et al. | 429/172 |
| 4,020,241 | 4/1977 | Heinz | 429/172 |

FOREIGN PATENT DOCUMENTS 0984876 12/1966 France .................. 429/164

Primary Examiner—Donald L. Walton
Attorney, Agent, or Firm—Toren, McGeady and Stanger

[57] ABSTRACT

A contact assembly for use in alkaline electric cells, includes a inner metal disk and an outer metal disk which engage one another coaxially when embedded in a cell end cover to form a cell anode. The inner metal disk has a neck-like cylindrical projection having an axial bore, the projection extending inwardly of the cell. One end of a collector rod within the cell is seated within the bore of the projection so as to remain in electrical contact with the inner periphery of the projection and, thus, with the anode formed by the two metal disks, in the event the anode is caused to move outwardly of the cell in response to gas pressure developed within the cell.

3 Claims, 13 Drawing Figures

CONTACT IN ALKALINE ELECTRIC CELLS

BACKGROUND OF THE INVENTION

The present invention relates to a new type of contact assembly in alkaline electric cells, by means of which continuity is ensured independently of the chemical processes brought about inside the cells.

Problems are known to arise in alkaline electric cells wherein hydrogen gas evolves in the cell interior due to the slow oxidation of zinc which constitutes the cell anode, thereby causing internal pressures which deform the cell structure. This deformation produces loss of electrical continuity between the internal anode collector rod and the bottom or external anode of the cell. This pressure increase, if caused by a defect which reacts more rapidly, may eventually burst the cell, because gas evolves also more rapidly.

SUMMARY OF THE INVENTION

A new contact of guaranteed continuity is realized by means of two interlocked metal disks. An inner disk has, along its central axis, an inwardly directed cylindrical projection formed in such a way that the rod-shaped negative collector within the cell electrically contacts the bottom external cell anode, not only axially but coaxially, thus maintaining contact even if some deformation should occur. The external cell anode is formed by the inner disk and the remaining metal disk which faces outwardly of the cell.

The present contact assembly including the two metal disks can be realized with differently perforated apertures in the disks, wherein the outer disk has apertures different in number and angle than the inner disk. This assures in any event the partial or total coincidence of an inner and outer disk perforation. The disks may be embedded at their edges in a cell end cover of plastics material. The cell end cover also may form an axially parallel annular furrow which is tapered in the axial direction to become narrower just ahead of a pair of coinciding apertures in the inner and outer disks. Accordingly, in case of a disproportionate increase in internal cell pressure, the plastics will yield at the frontal angular point of the coincident apertures.

In another embodiment of the present contact assembly, the inner metal disk has, on the flat surface of the disk which faces outwardly of the cell, a semi-toroidal countersink which allows a series of small apertures in the outer disk to coincide exactly with a number of other tapered apertures formed in the plastics end cover of the cell, thereby facilitating the access of air to the positive electrode of the alkaline cell with depolarization by air (also called zinc/air cells).

The description of the various parts which comprise the present contact assembly will be made below with the aid of the figures of the attached sheets of drawing, in which are illustrated embodiments of the invention given by way of examples without limitation. Accordingly, variants of any kind, as long as they are merely incidental and do not bring about a new and different result, must be considered included within the scope of the invention as defined by the appended claims.

DETAILED DESCRIPTION OF THE INVENTION

Figure 1:
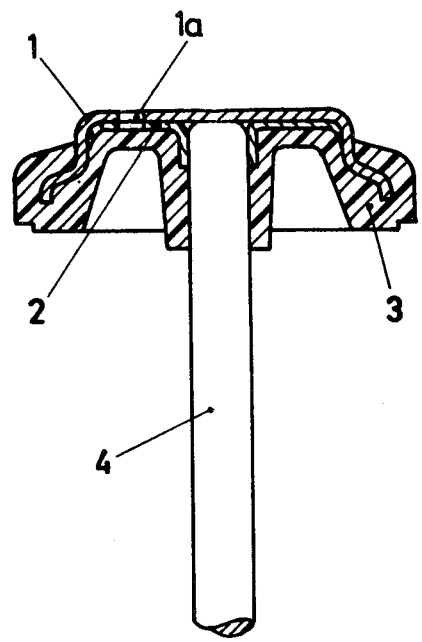
FIG. 1 is an axial sectional view of a contact assembly formed by a bottom anode embedded in polyethylene, and an inner collector rod, according to the present invention.
Figure 2:
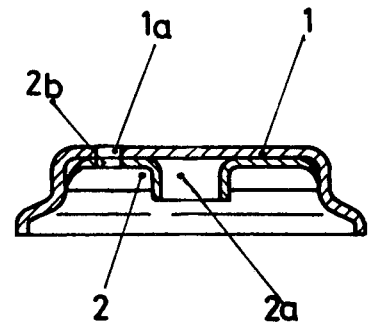
FIG. 2 is an axial sectional view of two disks arranged to form the anode shown in FIG. 1.
Figure 3:
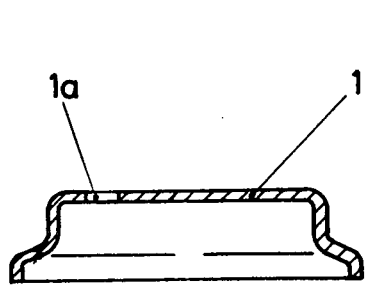
FIG. 3 is an axial sectional view of the outer disk forming the anode in FIG. 1.

The reference characters in the figures of the drawing each refer always to the same component in all of the figures.

Figure 5:
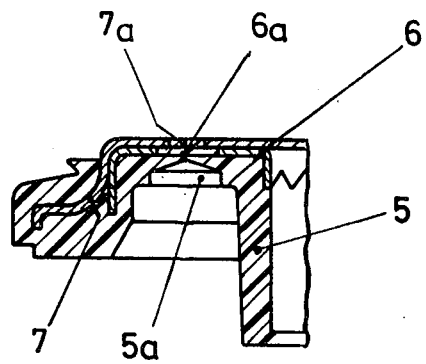
FIG. 5 is a partial, axial sectional view of a contact assembly forming an anode according to the present invention, in an embodiment wherein the anode is embedded in polyethylene so that, due to the thickness of the polyethylene in certain zones, it is permeable to hydrogen gas.
Figure 6:
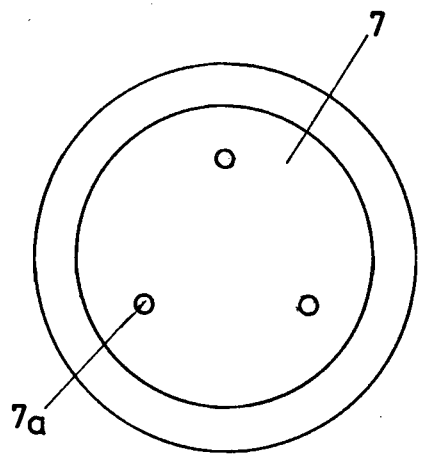
FIG. 6 is a top view in plan of an anode having outlet apertures, according to the invention, in the embodiment of FIG. 5.
Figure 8:
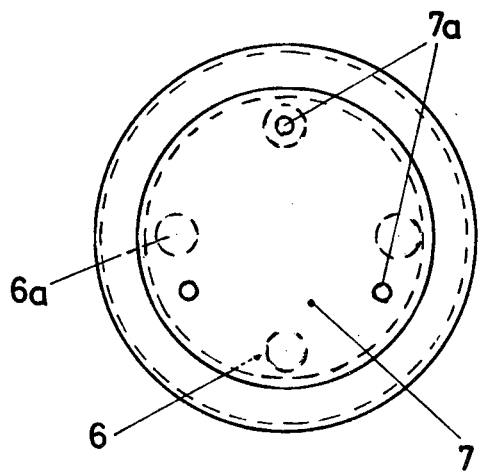
FIG. 8 is a top view in plan of the contact assembly of FIG. 5 formed by an outer disk and an inner disk, and showing placement of the disk apertures when the disks are fixed in the cell cover.
Figure 9:
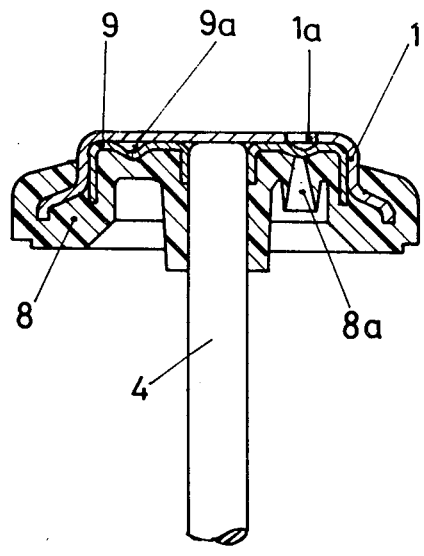
FIG. 9 is an axial sectional view of a contact assembly, according to an embodiment in which the inner disk of the anode has a semi-toroidal countersink, and the outer disk has apertures coincident with those in the plastics end cover of the cell.
Figure 11:
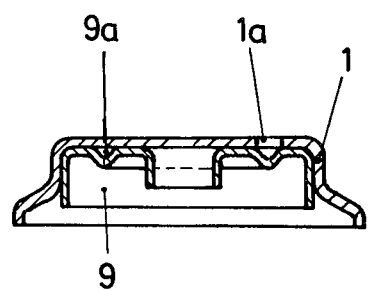
FIG. 11 is an axial sectional view of a contact assembly formed by a outer disk and an inner disk, according to the embodiment shown in FIG. 9.

FIGS. 1–3 and 9–12 show an outer cell bottom or disk 1, and FIGS. 5, 6 and 8 show an outer cell bottom or disk 7, either of which disks may be formed by deep-drawing a conductive metal disk. The countersink of the disk 1 or 7 has, on its flat surface and in an off-center location, one or more apertures 1a or 7a.

Figure 4:
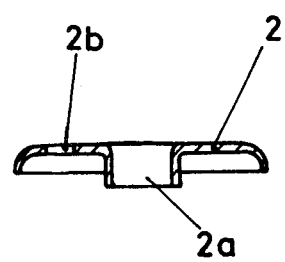
FIG. 4 is an axial sectional view of the inner disk forming the anode in FIG. 1.
Figure 7:
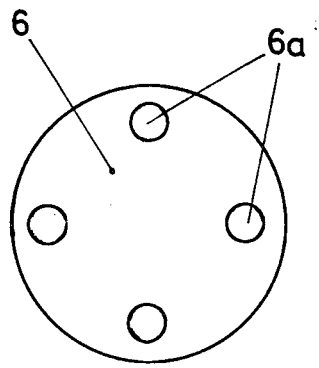
FIG. 7 is a top view in plan of an inner disk or counterbottom with apertures, forming the contact assembly in the embodiment of FIG. 5.

An inner disk, or counterbottom 2 or 6 (FIGS. 4 and 7) is made in the same manner as the disk 1 and 7, and has a cylindrical outer periphery which permits its engagement inside the countersink of the disk 1 or 7. The inner disk 2 or 6 likewise has one or more apertures 2b or 6a formed on its flat surface and in an off-center location, so as to coincide with the apertures 1a or 7a in the outer disks 1 or 7.

A neck-like projection at the center of the inner disk 2 or 6 forms a central bore 2a which, by means of its deep drawn contour, provides a cylindrical, coaxial electrical contact between the inner disk 2 or 6 and the inner collector rod 4.

Polyethylene cell covers 3, 5 and 8 (FIGS. 1, 5, 9 and 10) are arranged to embed the outer and inner disks. In the embodiment employing the permeable cover 5 (FIG. 5), the cover 5 has an annular groove 5a, and in the embodiment employing the cover 8 (FIG. 9), the cover 8 has a series of tapered, axially parallel communication openings 8a.

The cell inner collector is formed by the cylindrical rod 4 which fits, axially and coaxially, in the cell anode formed by the inner and outer disks, and thereby maintains electrical contact with the cell anode by means of the central projection of the inner disk 2, 6 or 9.

Figure 10:
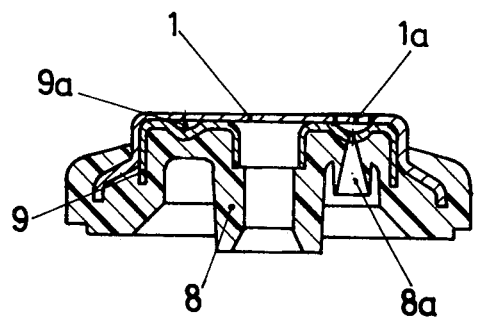
FIG. 10 is an axial sectional view of the embodiment shown in FIG. 9, but without a collector rod.
Figure 12:
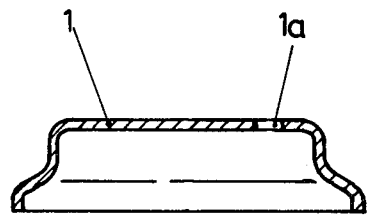
FIG. 12 is an axial sectional view of the outer disk in the embodiment of FIG. 9.
Figure 13:
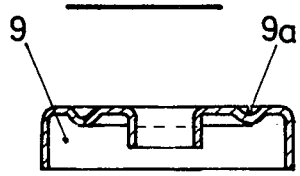
FIG. 13 is an axial sectional view of the inner disk having the semi-toroidal countersink, according to the embodiment of the present invention shown in FIG. 9.

FIG. 10 shows the inner disk 9 which is formed in the same manner as the disks 2 and 6, and engages the cover 8. The inner disk 9 has a semi-toroidal groove 9a formed in its flat surface, the groove 9a opening toward the outer disk 1.

While the foregoing description and drawing represent the preferred embodiments of the present invention, it will be obvious to those skilled in the art that various changes and modifications may be made therein without departing from the true spirit and scope of the present invention.

I claim:

1. In an alkaline electric cell having a contact assembly therein, the improvement wherein said contact assembly comprises an inner metal disk and an outer metal disk arranged to engage one another in coaxial relation to form an exterior anode for the alkaline electric cell, said inner metal disk forming a cylindrical projection having a bore which is coaxial with said inner and said outer metal disks wherein said projection extends inwardly of the cell, a cell end cover of plastics material in which the edges of said inner and said outer metal disks are embedded, and a cylindrical collector rod arranged coaxially within the cell wherein one end of said rod is seated in the bore of said cylindrical projection in electrical contact with the inner circumference of said bore so that said electrical contact is maintained when said rod and said end cover including said projection are moved relative to one another over a certain distance in the axial direction.

2. A cell according to claim 1, wherein said inner metal disk has in its flat portion a semi-toroidal countersink which opens toward said outer metal disk, said outer metal disk having a number of off-center apertures in its flat portion which apertures open into said countersink, said cell end cover having a corresponding number of axially parallel tapered passageways the narrow ends of which open against the side of said countersink facing opposite said outer metal disk and coinciding with said apertures in said outer metal disk.

3. A cell according to claim 1, wherein said inner and said outer metal disks have different numbers of apertures in their flat portions so that one of the apertures in said outer disk coincides with one of the apertures in said inner metal disk, the portion of said end cover in the region of the coinciding apertures being of reduced thickness so that said end cover portion can yield and allow gases developed within the cell to escape through the coinciding perforations when the pressure of said gases exceeds a certain level.

* * * * *

UNITED STATES PATENT AND TRADEMARK OFFICE
CERTIFICATE OF CORRECTION

PATENT NO. : 4,447,507
DATED : May 8, 1984
INVENTOR(S) : Javier A. Larranaga

It is certified that error appears in the above-identified patent and that said Letters Patent is hereby corrected as shown below:

On the title page insert:

[30]   Foreign Application Priority Data
  September 29, 1981   [ES]   Spain ........... 260,509
  October 26, 1981     [ES]   Spain ........... 261,011
  July 16, 1982        [ES]   Spain ........... 266,426

Signed and Sealed this

Twenty-third Day of October 1984

[SEAL]

Attest:

GERALD J. MOSSINGHOFF

*Attesting Officer*    *Commissioner of Patents and Trademarks*